United States Patent [19]

Nakamura et al.

[11] Patent Number: 5,245,452
[45] Date of Patent: Sep. 14, 1993

[54] ACTIVE MATRIC DRIVE LIQUID CRYSTAL DISPLAY DEVICE USING POLYCRYSTALLINE SILICON PIXEL ELECTRODES

[75] Inventors: Akira Nakamura, Ibaraki; Kohji Senda, Nagaokakyo; Eiji Fujii, Takatsuki; Fumiaki Emoto, Hirakata; Yasuhiro Uemoto, Takatsuki; Atsuya Yamamoto, Hirakata; Kazunori Kobayashi, Takatsuki, all of Japan

[73] Assignee: Matsushita Electronics Corporation, Osaka, Japan

[21] Appl. No.: 369,476

[22] Filed: Jun. 21, 1989

[30] Foreign Application Priority Data

| Jun. 24, 1988 | [JP] | Japan | 63-157174 |
| Jun. 24, 1988 | [JP] | Japan | 63-157176 |
| Nov. 4, 1988 | [JP] | Japan | 63-279918 |
| Mar. 20, 1989 | [JP] | Japan | 1-68032 |
| Jun. 5, 1989 | [JP] | Japan | 1-142534 |

[51] Int. Cl.$^5$ .......................................... G02F 1/1343
[52] U.S. Cl. ............................................. 359/59; 257/350
[58] Field of Search ................ 357/2, 4, 23, 7, 30 G, 357/30 I, 59 E, 59 C, 59 D, 23.6, 23.7, 23.4; 350/333, 334, 336; 340/717, 718; 359/59; 257/347, 222, 350, 352

[56] References Cited

U.S. PATENT DOCUMENTS

| 4,437,225 | 3/1984 | Mizutani | 357/4 |
| 4,471,371 | 9/1984 | Hamano | 357/2 |
| 4,598,305 | 7/1986 | Chiang et al. | 357/30 |
| 4,644,402 | 2/1987 | Yamada | 357/301 |
| 4,732,830 | 3/1988 | DiSanto et al. | 350/333 |
| 4,746,628 | 3/1988 | Takafuji et al. | 357/4 |
| 4,814,842 | 3/1989 | Nakagawa et al. | 357/23.7 |
| 4,849,797 | 7/1989 | Ukai et al. | 357/2 |
| 4,850,675 | 7/1989 | Hatanaka et al. | 350/333 |
| 4,859,623 | 8/1989 | Busta | 357/23.7 |
| 4,876,582 | 10/1989 | Janning | 357/23.7 |
| 4,908,518 | 3/1990 | Losee et al. | 257/222 |

FOREIGN PATENT DOCUMENTS

| 0002107 | 5/1979 | European Pat. Off. |
| 186036 | 7/1986 | European Pat. Off. |
| 212065 | 3/1987 | European Pat. Off. |
| 223967 | 6/1987 | European Pat. Off. |

Primary Examiner—Alvin E. Oberley
Assistant Examiner—Chanh Nguyen
Attorney, Agent, or Firm—Stevens, Davis, Miller & Mosher

[57] ABSTRACT

An image display device includes thin film transistors and pixel electrodes arranged in matrix form on a substrate. A semiconductor layer forming a channel region of the thin film transistor also serves as the pixel electrode, thereby making the structure of the device simple and facilitating fabrication thereof.

14 Claims, 11 Drawing Sheets

|← TFT AREA →|← PIXEL ELECTRODE AREA →|

IMPLANTATION OF P⁺ IONS

|←TFT AREA→|←PIXEL ELECTRODE AREA→|

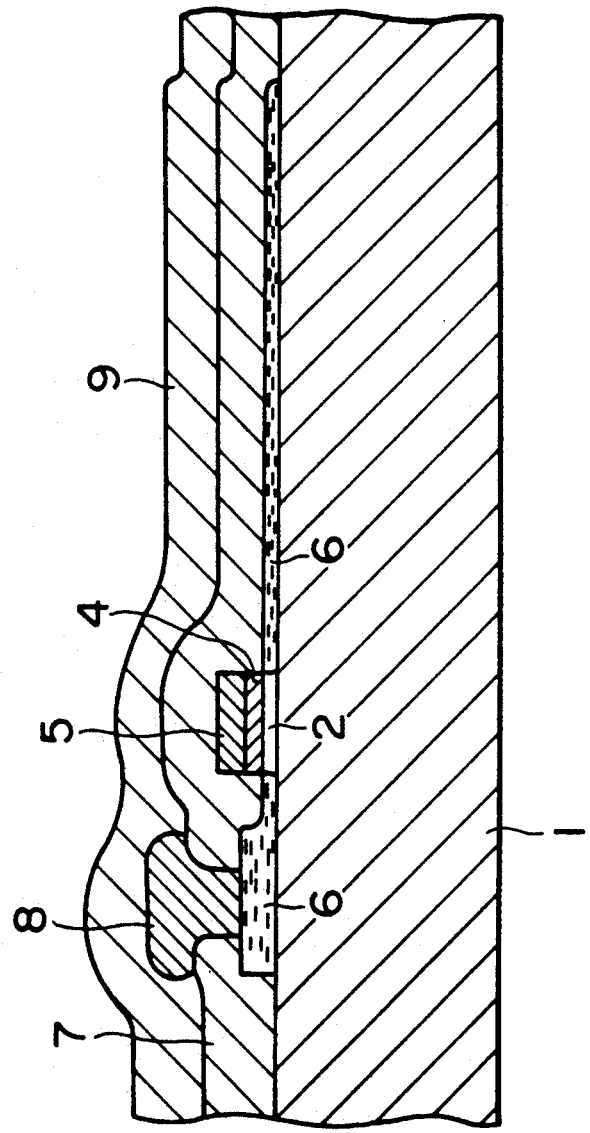

ACTIVE MATRIC DRIVE LIQUID CRYSTAL DISPLAY DEVICE USING POLYCRYSTALLINE SILICON PIXEL ELECTRODES

BACKGROUND OF THE INVENTION

1. Field of the Invention

The present invention relates to an image display device, and more particularly to an image display device using a liquid crystal.

2. Description of the Related Art

An image display device using a liquid crystal comprises a plurality of switching elements arranged in a matrix form on a substrate, transparent pixel electrodes connected to the respective switching elements, and a transparent common electrode provided opposite to the transparent pixel electrodes. The liquid crystal is sandwiched between the transparent pixel electrodes and the transparent common electrode. A voltage is applied between a selected one of the transparent electrodes and the transparent common electrode to control the polarizing characteristic of the liquid crystal at the selected pixel or to adjust the amount of light transmitted through the liquid crystal, thereby displaying a desired image.

FIG. 15 shows the conventional structure of a pixel portion having a switching action. In the figure, reference numeral 101 designates a quartz substrate, numeral 102 a polycrystalline silicon (hereinafter referred to simply as poly-Si) thin film for forming a switching TFT (thin film transistor), numeral 103 a gate oxide film, numeral 104 a poly-Si thin film for a gate electrode, numeral 105 n-type regions by which a source and a drain of the TFT are provided, numeral 106 an NSG (nondoped-silicate-glass) film, numeral 107 an Al line film for wiring, numeral 108 a silicon nitride film, numeral 109 a Cr film for ITO (indium tin oxide) contact, numeral 110 an ITO film as a transparent pixel electrode, numeral 111 an NSG film for passivation, and numeral 112 an Al electrode for ITO contact.

In the above-mentioned structure of the pixel portion, since the Cr film 109 for protection of the Al electrode film 112 must be formed in order to prevent the Al film 112 from being corroded by an etching solution which is used for patterning the ITO film 110 to form the transparent pixel electrode, a process for fabrication of the device becomes complicated. Further, breakages may be generated in the silicon nitride film 108 and/or the NSG film 106 in the course of the process steps of forming the Cr film and the ITO film so that breakdown of the Al line film 107 occurs, thereby deteriorating the fabrication yield.

SUMMARY OF THE INVENTION

An object of the present invention made in view of the above-mentioned problems of the conventional device is to provide an image display device which has a simple structure and can be fabricated by use of the conventional MOS process.

To attain the above object, in an image display device according to the present invention, a pixel electrode is formed by a semiconductor layer used for formation of a switching transistor.

With this structure, the process steps for formation of the Cr film and the ITO film necessitated in the conventional device are eliminated, thereby making it possible to make the fabrication process very simple as compared with the conventional fabrication process and to prevent breakdown of an Al line film caused by the breakages of a silicon nitride film and/or an NSG film which breakages may otherwise occur. As a result, the fabrication yield of the device can be improved.

BRIEF DESCRIPTION OF THE DRAWINGS

FIG. 4 is a view showing the structure of a pixel portion of an image display device according to a second embodiment of the present invention;

DESCRIPTION OF THE PREFERRED EMBODIMENTS

A first embodiment of the present invention will now be explained with reference to FIGS. 1 and 2.

Figure 1:
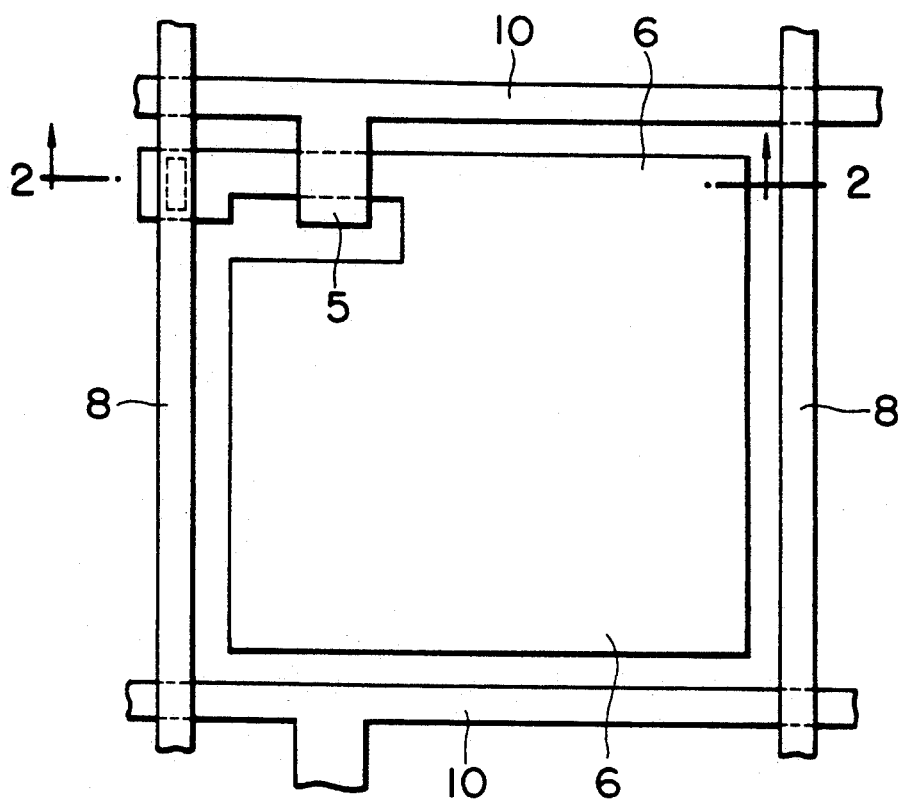
FIG. 1 is a plan view of a pixel portion of an image display device according to a first embodiment of the present invention.
Figure 2:
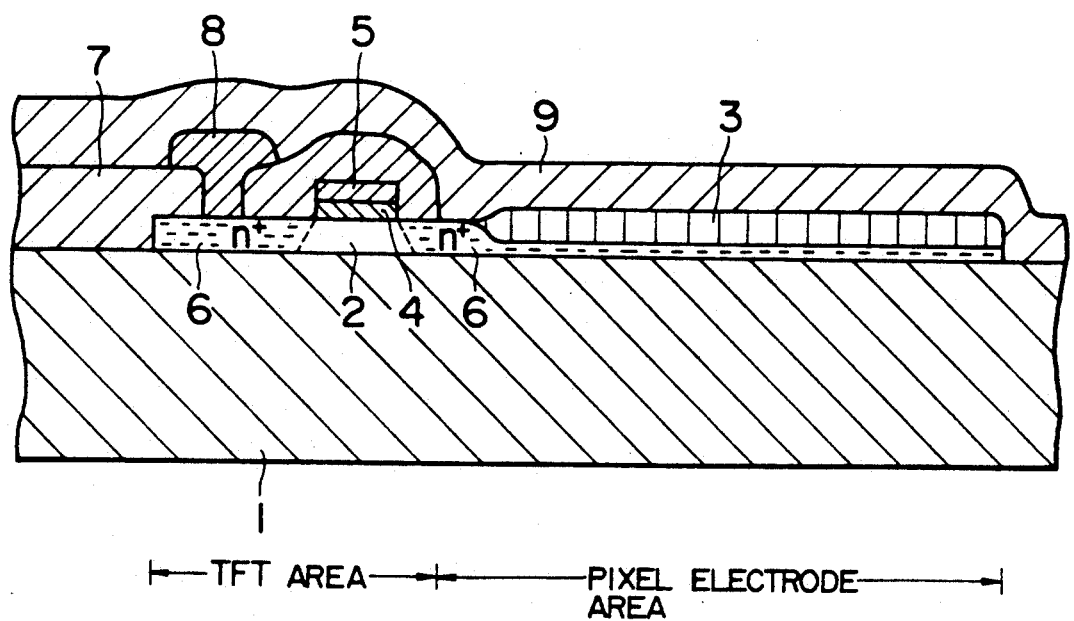
FIG. 2 is a cross section taken along line II—II in FIG. 1.

FIG. 1 is a plan view of a pixel portion of an image display device according to the first embodiment of the present invention, and FIG. 2 is a cross section taken along line II—II in FIG. 1. In FIG. 2, reference numeral 1 designates a quartz substrate and numeral 2 designates a poly-Si layer or film. The poly-Si film 2 serves both as a pixel electrode and as a part of a switching TFT. Reference numeral 3 designates an $SiO_2$ film, numeral 4 a gate oxide film, numeral 5 a poly-Si film as a gate electrode, numeral 6 n-type regions by which a source and a drain of the TFT are provided, numeral 7 an NSG film, numeral 8 an Al line film for wiring or signal line, and numeral 9 an $SiN_x$ film formed by means of plasma CVD (chemical vapor deposition) technique. A portion of the poly-Si film for the pixel electrode may have the same thickness (1500-2000 Å) as a portion of the poly-Si film for the TFT in the case where a black and white image is to be displayed. On the other hand, in the case of a color image, a thickness in the order of 500 Å is required for the pixel electrode poly-Si film in order to increase the transmittance for bluelight to enhance the sensitivity for bluelight. However, if the thickness of the TFT poly-Si film is made smaller than 1500 Å, Si melts in Al in a solid solution upon formation of an ohmic contact with the Al film 8 at a source contact portion, thereby resulting in an inferior contact. Therefore, it is necessary that the thickness of the poly-Si film in the source region of the TFT is not smaller than 1500 Å. In order to satisfy the above requirements, it is required to provide a difference between the thickness of the portion of the poly-Si film 2 in a TFT area and the thickness of the portion of the poly-Si film 2 in a pixel electrode area.

To the gate electrode 5 is applied a scanning pulse signal from a gate electrode line 10 (see FIG. 1) which is formed contiguous to the gate electrode 5. The signal line 8 is disposed orthogonally to the gate electrode line 10, and a voltage to be applied to the pixel electrode 6 corresponding to an image to be displayed is supplied to the signal line 8 during a period of time when the scanning pulse is applied.

Figure 3A:
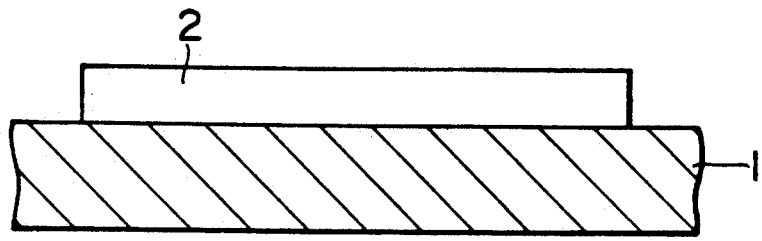
FIGS. 3a to 3d show in cross section the successive process steps for fabrication of the pixel portion in the first embodiment of the present invention.
Figure 3B:
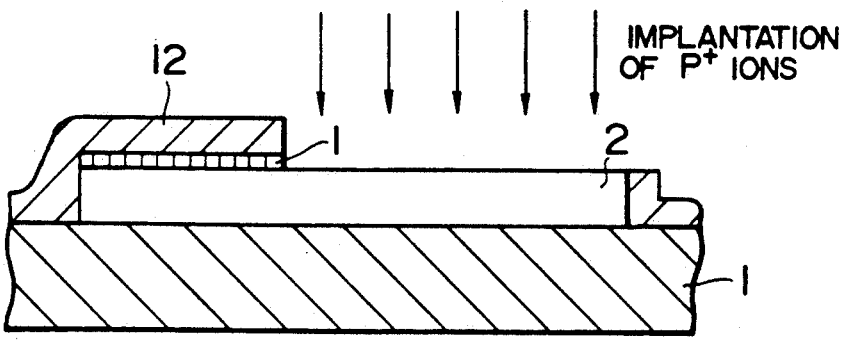
Figure 3C:
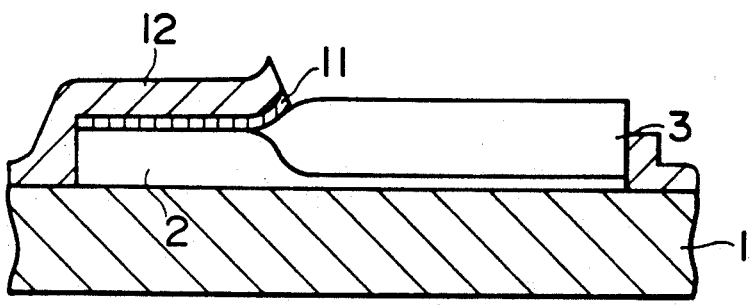
Figure 3D:
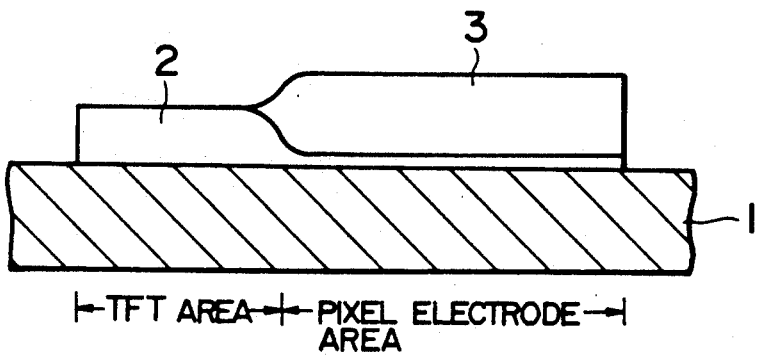

Next, a method of fabricating the thus constructed pixel portion of the image display device will be explained referring to FIGS. 3a to 3d. First, as shown in FIG. 3a, a poly-Si layer or film 2 having a thickness of 2000 Å is formed on a quartz substrate 1 by means of LPCVD (low pressure chemical vapor deposition) technique and is thereafter dry-etched to provide an island-wise isolated portion which includes a TFT area and a pixel electrode area. Next, a thermal oxide film 11 having a thickness of 500 Å is formed on a surface of the poly-Si film 2 and a nitride film 12 is deposited on the oxide film 11. Portions of the nitride film 12 and the oxide film 11 corresponding to the pixel electrode area are removed and P+ ions are implanted as shown in FIG. 3b in order to bring the pixel electrode portion into a conductive condition. As the next step, as shown in FIG. 3c, a thermal oxide film 3 is formed at only the pixel electrode area by means of a LOCOS (localized oxidation of silicon) technique to reduce the thickness of the poly-Si film 2 to the order of 500 Å. Finally, the nitride film 12 and the oxide film 11 are removed to provide a structure as shown in FIG. 3d. Thereafter, the TFT area is formed in accordance with the conventionally used MOS process.

According to the present embodiment, by virtue of the use of the poly-Si film as the pixel electrode, the breakages of the SiN$_x$ film and the NSG film which may occur in the conventional device could be prevented and the breakdown of the Al line could be greatly reduced.

Further, the process of the image display device could be simplified.

Though the poly-Si film has been used for formation of the TFT and the pixel electrode, another semiconductor material may be used by which the TFT and the pixel electrode can be formed.

FIG. 4 shows the structure of a pixel portion of an image display device according to a second embodiment of the present invention. In FIG. 4, reference numeral 1 designates a quartz substrate, numeral 2 a poly-Si layer or film, numeral 4 a gate oxide film, numeral 5 a poly-Si film as a gate electrode, numeral 6 n-type regions by which a source, a drain and a pixel electrode are formed, numeral 7 an NSG film, numeral 8 an Al line film for wiring, and numeral 9 an SiN$_x$ film formed by means of a plasma CVD technique. In the case of a color image, the thickness of the poly-Si film for the pixel electrode must be made thin enough (in the order of 500 Å) to allow the transmission of light therethrough in order to enhance especially the sensitivity for bluelight. As for the transistor characteristics of the TFT, gm (mutual conductance) becomes high and also the leakage current is reduced as the thickness of a channel region of the TFT is made thin. The thickness of a portion of the poly-Si film at which an Al contact for the TFT is formed is selected to be not smaller than 1500 Å.

Figure 5A:
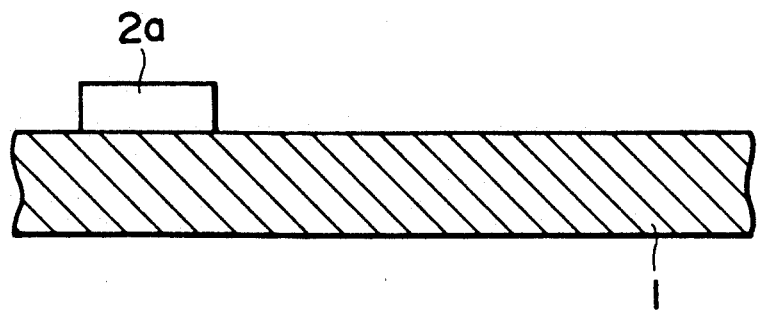
FIGS. 5a to 5d show in cross section the successive process steps for fabrication of the pixel portion in the second embodiment of the present invention.
Figure 5B:
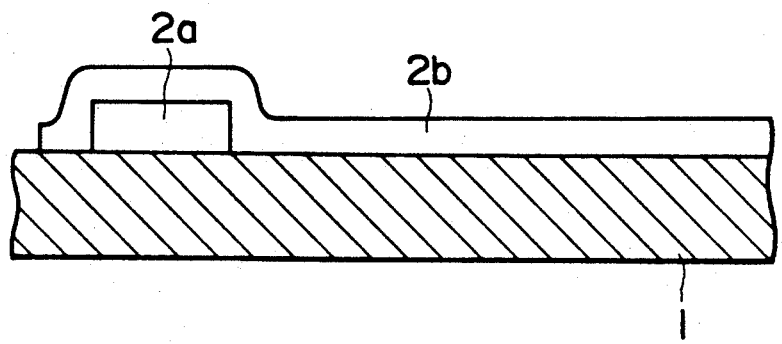
Figure 5C:
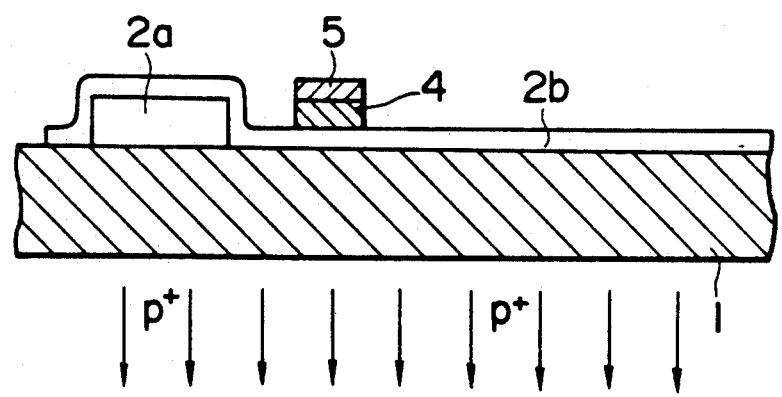
Figure 5D:
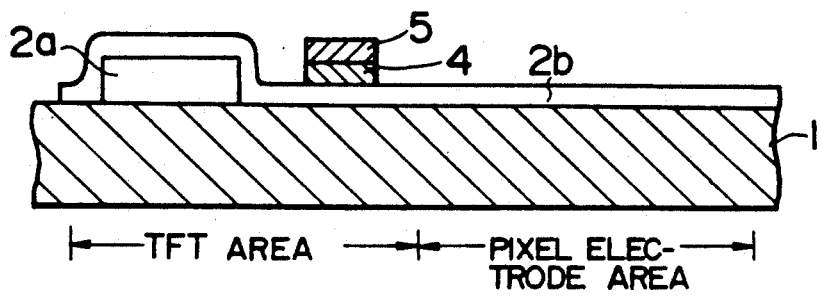

A method of fabricating the thus constructed pixel portion of the image display device will now be explained by virtue of FIGS. 5a to 5d. First, as shown in FIG. 5a, a first-layer poly-Si thin film 2a having a thickness of 2000 Å is formed on a quartz substrate 1 by means of a PLCVD technique and is thereafter patterned leaving an island-like poly-Si thin film at only a region where a contact is to be formed. Next, a second-layer poly-Si thin film 2b having a thickness of 1110 Å is formed as shown in FIG. 5b. Then, as shown in FIG. 5c, a gate oxide film 4 having a thickness of 1300 Å is formed through thermal oxidation of the poly-Si thin film 2b. At this time, the thickness of the poly-Si film in a pixel electrode area is reduced to about 500 Å due to the thermal oxidation. A poly-Si film 5 is deposited on the gate oxide film 4, thereby forming a gate electrode. Finally, as shown in FIG. 5d, P+ ions are implanted in a self-aligned manner to form n-type regions and to bring the pixel electrode portion into a conductive condition. Since an oxide film at an interface between the first-layer poly-Si thin film 2a and the second-layer poly-Si thin film 2b is completely destroyed by virtue of the ion implantation, a satisfactory contact can be formed. After the poly-Si pixel area has been formed, a structure as shown in FIG. 4 is completed in accordance with the conventionally used process.

According to the present embodiment, since portions of the poly-Si film in the pixel electrode area and in the channel region of the TFT are made thin, the transmittance of blue light is sufficient and the value of gm (mutual conductance) can be made large and also the leakage current is reduced as compared with the conventional device. On the other hand, since only a portion of the poly-Si film at which the contact to the Al line is formed with a thickness not smaller than 1500 Å, a satisfactory ohmic contact can be obtained.

Figure 6:
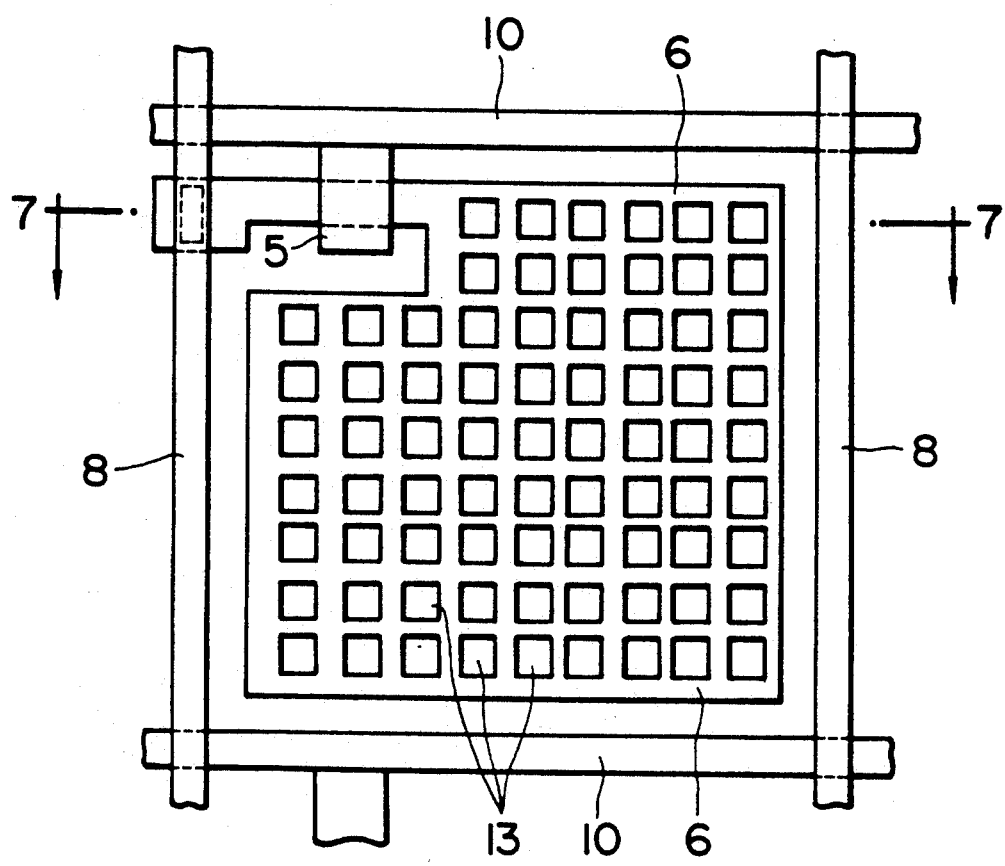
FIG. 6 is a plan view showing the construction of a liquid display device according to a third embodiment of the present invention in the vicinity of a pixel electrode thereof.
Figure 7:
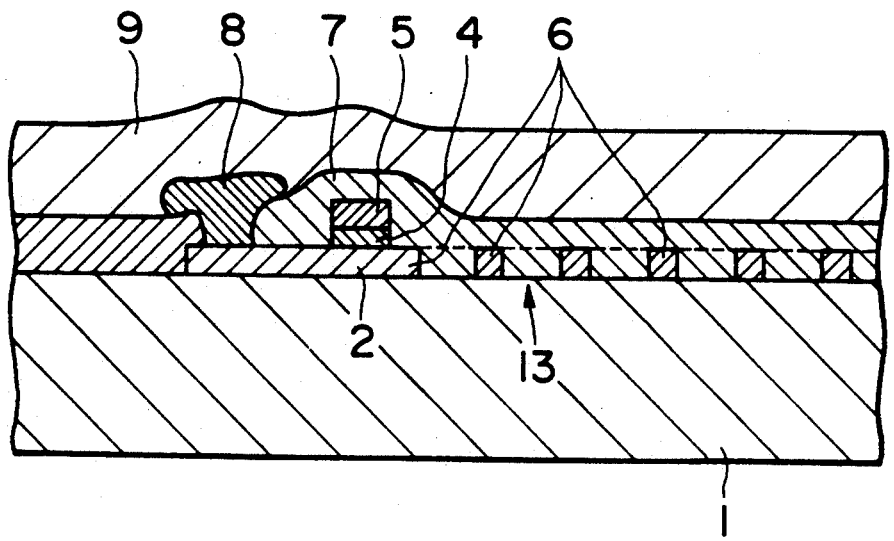
FIG. 7 is a cross section taken along line VII—VII in FIG. 6.

FIG. 6 is a plan view showing the construction of a liquid crystal display device according to a third embodiment of the present invention in the vicinity of a pixel electrode thereof, and FIG. 7 is a cross section taken along line VII—VII in FIG. 6.

In the liquid crystal display device according to the present embodiment, a multiplicity of minute light-transmissible holes 13 are distributed or formed over the entire area of a pixel electrode 6 made of a polycrystalline silicon layer or film. For example, each of the light-transmissible holes 13 has an approximately square shape the length of each side of which is about 2 μm, and they are formed with a pitch of 3 μm along each side of the pixel electrode 6. Though the width of the polycrystalline silicon film between the adjacent light-transmissible holes 13 is small or in the order of 1 μm, the polycrystalline silicon film in a portion of the pixel electrode 6 converted into an n type in conductivity has a sufficiently low resistivity and hence the sheet resistance of the pixel electrode 6 is sufficiently low even if the light-transmissible holes 13 are provided.

The size of the light-transmissible hole is selected to be sufficiently small as compared with the thickness (4 to 6 μm) of a liquid crystal layer (not shown). Therefore, even if the pixel electrode 6 provided with the multiplicity of light-transmissible holes 13 is used, it is possible to uniformly apply a voltage to the liquid crystal.

Figure 8A:
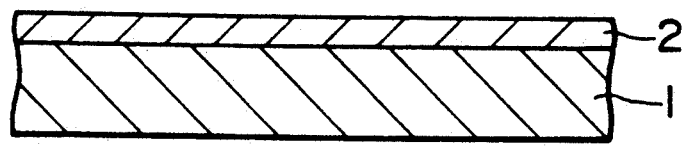
FIGS. 8a to 8d are cross sections for explaining a method of fabricating the liquid crystal display device in the third embodiment of the present invention.
Figure 8B:
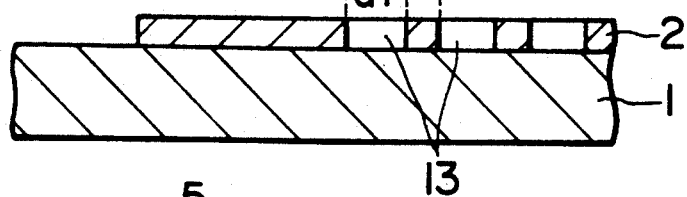

FIGS. 8a to 8d are cross sections for explaining a method of fabricating the liquid crystal display device according to the present embodiment. First, as shown in FIG. 8a, a polycrystalline silicon layer or film 2 is formed on a surface of a quartz substrate 1 by means of LPCVD technique. Thereafter, the polycrystalline silicon film 2 is patterned to form a pixel electrode. At this time, light-transmissible holes 13 are formed. The resultant structure is shown in FIG. 8b. The length d1 of each side of the light-transmissible hole 13 is for example, 2 μm and the pitch p1 of the light-transmissible 13 is, for example, 3 μm.

Figure 8C:
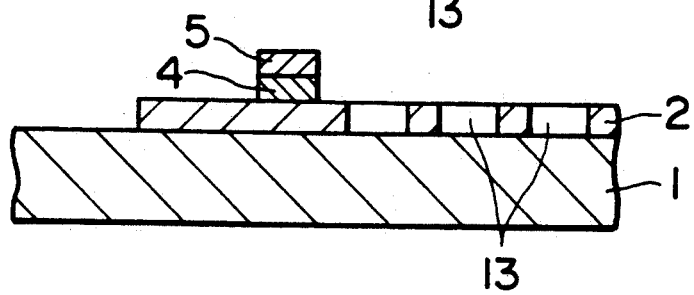

Next, as shown in FIG. 8c, a gate oxide film 4 having a thickness of 1300 Å is formed through thermal oxidation. At this time, the thickness of a portion of the polycrystalline silicon film 2 just below the gate oxide film 4 is reduced to the order of 800 Å due to the thermal oxidation. A gate electrode 5 made of a polycrystalline silicon film is deposited on the gate oxide film 4.

Figure 8D:
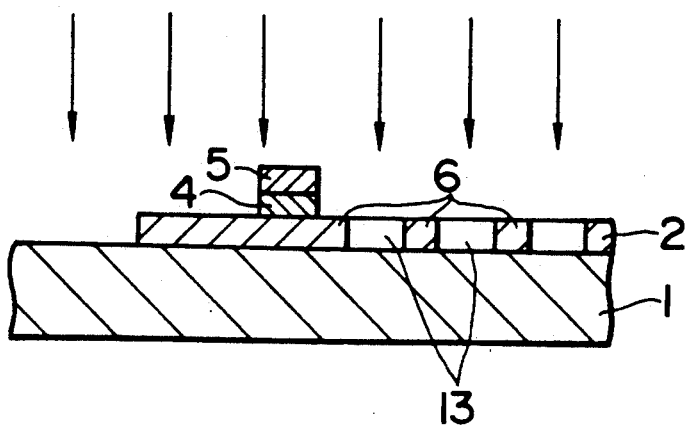

Thereafter, P+ or As+ ions are implanted as shown in FIG. 8d. By this, the remainder of the polycrystalline silicon film 2 excepting the portion thereof just below the gate oxide film 4 is converted into an n type in conductivity to form a source region, a drain region and the pixel electrode 6.

Thereafter, an NSG film 7, a signal line 8 and a plasma $SinN_x$ film 9 are successively formed in accordance with the conventional process to provide a structure shown in FIGS. 6 and 7. Further, subsequent process steps including the securing of a substrate (not shown) in opposite to the quartz substrate 1 and the filling of a liquid crystal are conducted to complete a liquid crystal display device.

In the thus fabricated liquid crystal display device according to the present embodiment, since the light-transmissible holes 13 are provided in the pixel electrode 6 made of the polycrystalline silicon film, the absorption of light by the polycrystalline silicon film can be prevented at the light-transmissible holes 13. Therefore, notwithstanding that the polycrystalline silicon film has a low light transmittance, the amount of light transmitted through the pixel electrode 6 can be increased, thereby making it possible to make the display screen bright. As a result, a satisfactory display condition can be obtained. The measurement by the present inventor has confirmed that the light transmittance in the liquid crystal display device according to the present embodiment is improved by at least 1.5 times as high as that in the conventional device in which no light-transmissible holes are provided.

In the above-mentioned embodiment, the shape of the light-transmissible hole 13 is approximately square. However, other hole shape may be employed. For example, the light-transmissible hole may have a slit-like shape. Also, the size of the light-transmissible hole 13 shown in the explanation of the above embodiment is an example, so that the present invention is not limited to the exemplified hole size.

Further, in the above-mentioned embodiment, the source region, the drain region and the pixel electrode 6 have been converted into the n type in conductivity by the implantation of P+ or As+ ions. However, they can be converted into a p type by the implantation of B+ ions Furthermore, though the above embodiment has been explained in conjunction with the case where the read gate is a single gate, the present invention can be preferably applied even to a dual gate.

Next, a fourth embodiment of the present invention will be explained in reference to FIGS. 9 to 11.

Figure 9:
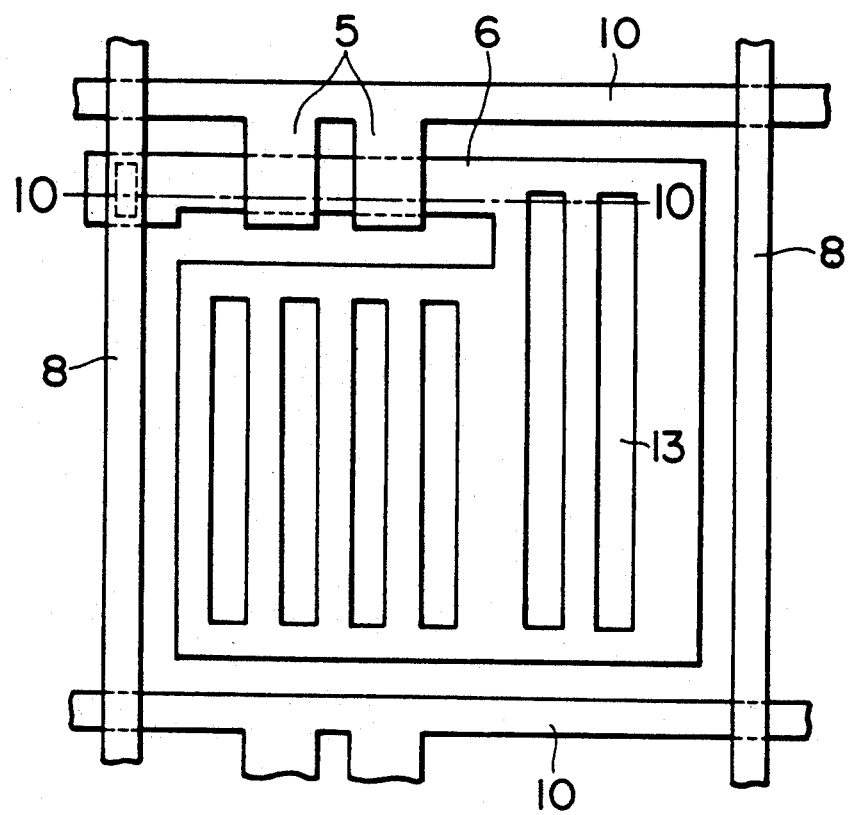
FIG. 9 is a plan view of a pixel portion of an image display device according to a fourth embodiment of the present invention.
Figure 10:
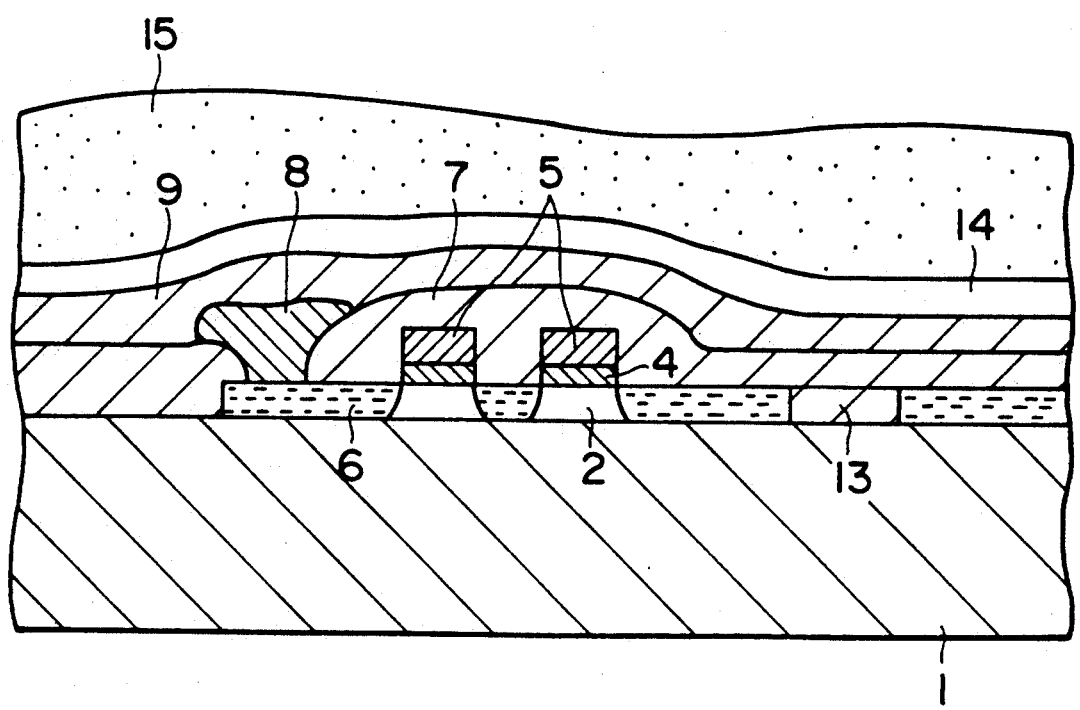
FIG. 10 is a cross section taken along line X—X in FIG. 9.

FIG. 9 is a plan view of a pixel portion of an image display device according to the present embodiment, and FIG. 10 is a cross section taken along line X—X in FIG. 9. In FIG. 10, reference numeral 1 designates a quartz substrate and numeral 2 designates a polycrystalline silicon layer or film. The polycrystalline silicon film 2 serves both as a pixel electrode and as a part of a switching dual-gate TFT (thin film transistor). Reference numeral 6 designates n-type regions by which a source and a drain of the TFT and the pixel electrode are formed, numeral 4 a gate oxide film, numeral 5 a polycrystalline silicon film as a gate electrode, numeral 7 an NSG film, numeral 8 an Al line film, numeral 9 an $SinN_x$ film formed by means of plasma CVD technique, numeral 14 an orientation film, and numeral 15 a liquid crystal. Since the resistivity of the n-type region 6 of the polycrystalline silicon film used as the pixel electrode is sufficiently low, no problem arises regarding the resistance of an electrode. As shown in FIG. 9, a plurality of parallel through-holes 13 each having a width of 2 μm and elongated in a rubbing direction of the orientation film are provided in the pixel electrode. Though the width of the stripe-shaped polycrystalline silicon film is in the order of 2 μm, the sheet resistance of the polycrystalline silicon layer is sufficiently low and hence it is sufficiently possible to uniformly apply a voltage to the liquid crystal.

Figure 11A:
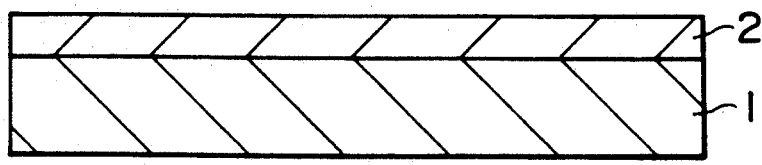
FIGS. 11a to 11d show in cross section the successive process steps for fabrication of the pixel portion in the fourth embodiment of the present invention.
Figure 11B:
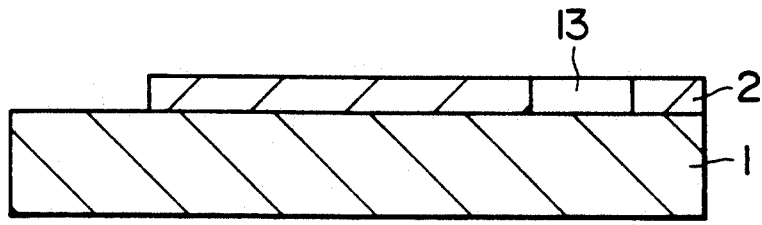
Figure 11C:
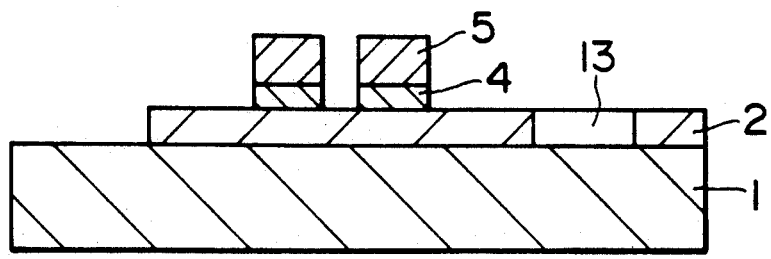
Figure 11D:
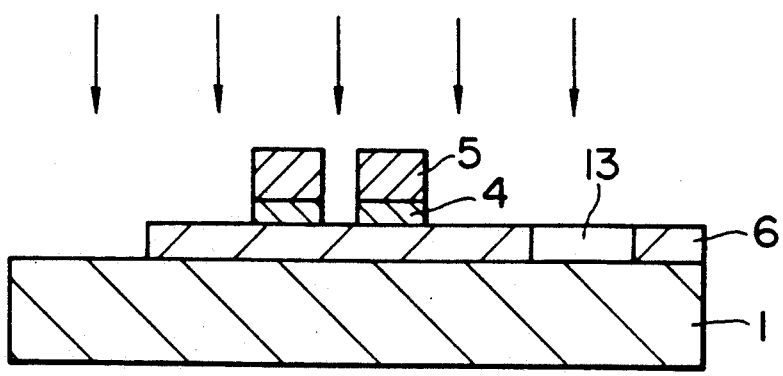

FIGS. 11a to 11d are cross sections for explaining a method of fabricating the pixel portion of the image display device according to the present embodiment. First, as shown in FIG. 11a, a polycrystalline silicon layer or film 2 is formed on a quartz substrate 1 by means of an LPCVD technique. Thereafter, the polycrystalline silicon film 2 is patterned so as to leave a thin film transistor and a polycrystalline pixel electrode, as shown in FIG. 11b. At this time, a multiplicity of stripe-shaped light-transmissible holes 13 lying side by side in one direction, as shown in FIG. 9, are provided in the pixel electrode. Next, a gate oxide film 4 having a thickness of 1300 Å is formed through thermal oxidation. At this time, the thickness of the polycrystalline silicon pixel electrode film is reduced to the order of 800 Å due to thermal oxidation. A polycrystalline silicon film 5 is deposited on the gate oxide film 4 to form a gate electrode, as shown in FIG. 11c. Next, as shown in FIG. 11d, P+ or As+ ions are implanted in a self-aligned manner to form n-type regions 6 and to bring the pixel electrode portion into a conductible condition. Thereafter, an NSG film 9, an Al line film 8 and a plasma $SinN_x$ film 9 (see FIG. 9) are successively formed in accordance with the conventionally used process. Further, an orientation film 14 is formed and rubbed. The rubbing is made in the same direction as the longitudinal direction of the stripe-shaped light-transmissible hole 13 provided in the polycrystalline silicon pixel electrode. Finally, a liquid crystal 15 is injected.

In the thus fabricated image display device, the polycrystalline silicon film having a light transmittance which is poor as compared with an ITO film is used for the pixel electrode. However, since the light-transmissible holes are provided in the polycrystalline silicon pixel electrode, it is possible to remarkably improve the effective light transmittance of the pixel electrode overall. The light transmittance of the image display device fabricated in accordance with the present embodiment has been improved to be at least two times as high as that of the conventional device in which no light-transmissible holes are provided. Also, since the stripe-shaped light-transmissible holes provided in the polycrystalline silicon film are elongated along the rubbing direction of the orientation film, the number of stepped portions of the orientation film produced due to the provision of the light-transmissible holes is very much less in the rubbing direction and hence it is possible to minimize the problem of inferior orientation that molecules in the orientation film are not aligned uniformly in the stepped portions of the orientation film.

In the present embodiment, a single-gate structure may be employed for the TFT with no problem. Further, though in the present embodiment the longitudinal direction of the light-transmissible holes provided in the polycrystalline silicon pixel electrode coincides with the extending direction of the Al line 8, the longitudinal direction of the light-transmissible holes may be perpendicular or oblique to the direction of the Al line 8 so long as the longitudinal direction of the light-transmissible holes is coincident with the rubbing direction of the orientation film.

Figure 12:
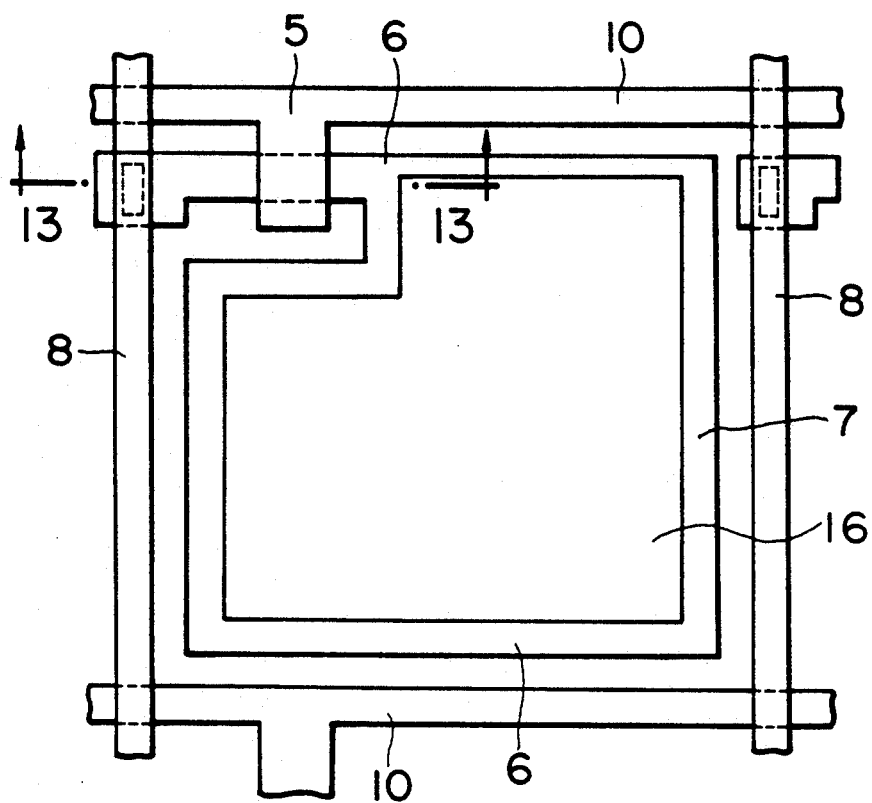
FIG. 12 is a plan view of a pixel portion of an image display device according to a fifth embodiment of the present invention.
Figure 13:
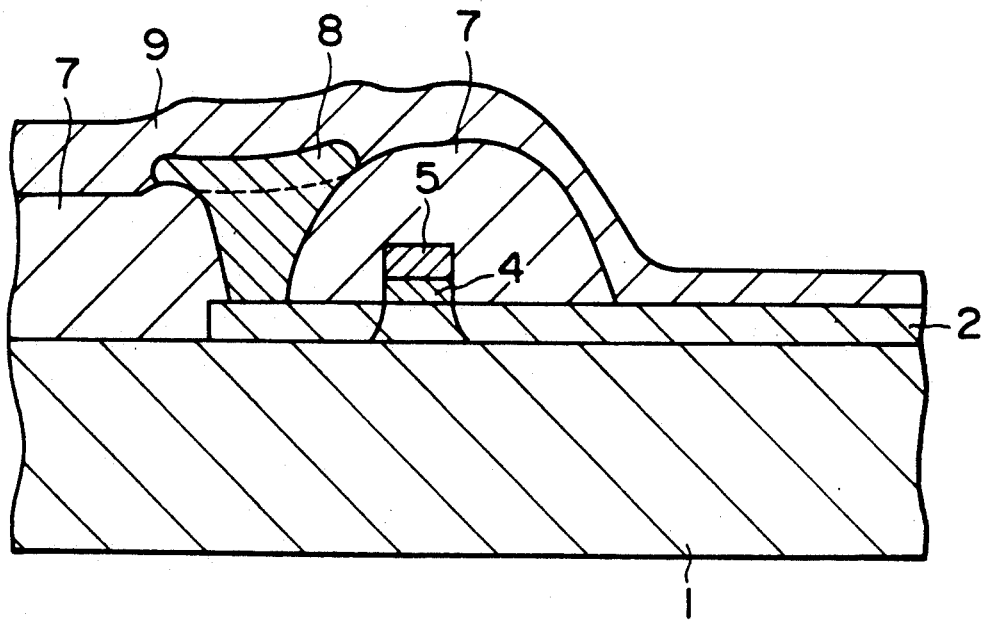
FIG. 13 is a cross section taken along line XIII—XIII in FIG. 12.

Next, a fifth embodiment of the present invention will explained by virtue of FIGS. 12, 13 and 14.

FIG. 12 is a plan view of a pixel portion of an image displaced device according to the present embodiment, and FIG. 13 is a cross section of a main part of the device taken along line xiii—XIII in FIG. 12.

The feature of the present embodiment lies in that an NSG film 7 is removed from the upper surface of a pixel electrode 6 contiguous to a drain region shown in FIG. 13 and a nitride film 9 is instead formed directly on that surface.

Referring to FIG. 12, a gate electrode line 10 along an X direction and an Al line 8 along a Y direction formed on the upper surface of the gate electrode line 10 through the NSG film 7 are provided in a grid form so that each pixel is formed at the intersection of the gate electrode line along the X direction and the Al line 8 along the Y direction. The Al line 8 is connected to a source region through a through-hole for contact provided in the NSG film 7. An inner side portion of the NSG film 7 along the outline of the pixel electrode portion of the polycrystalline silicon film 6 is removed.

Figure 14A:
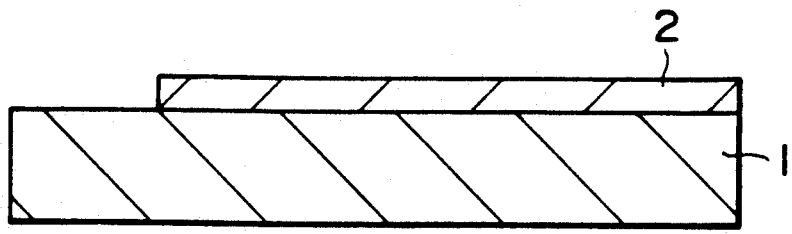
FIGS. 14a to 14e show in cross section the successive process steps for fabrication of the pixel portion in the fifth embodiment of the present invention.
Figure 14B:
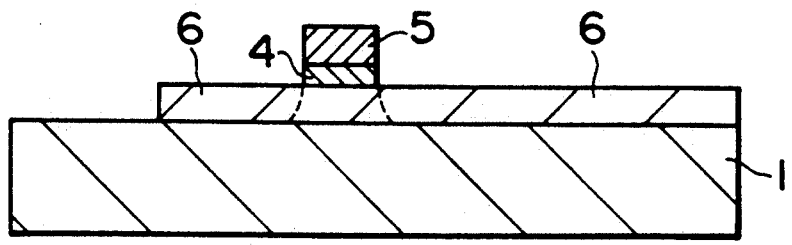
Figure 14C:
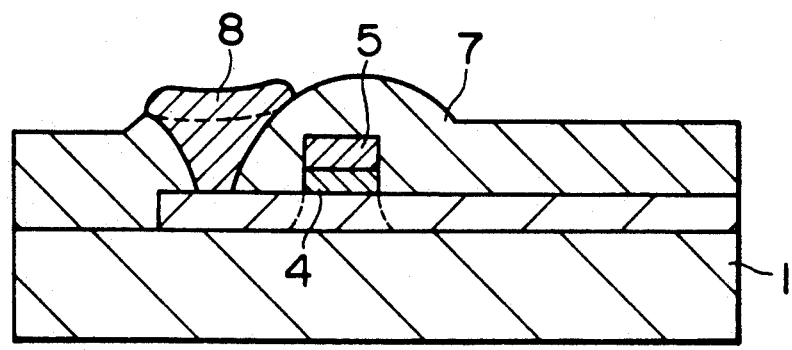
Figure 14D:
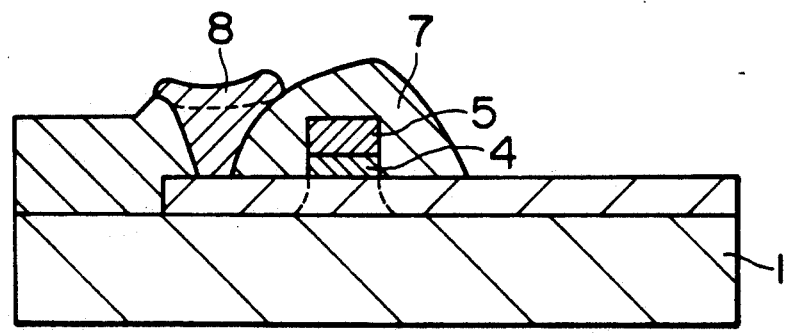
Figure 14E:
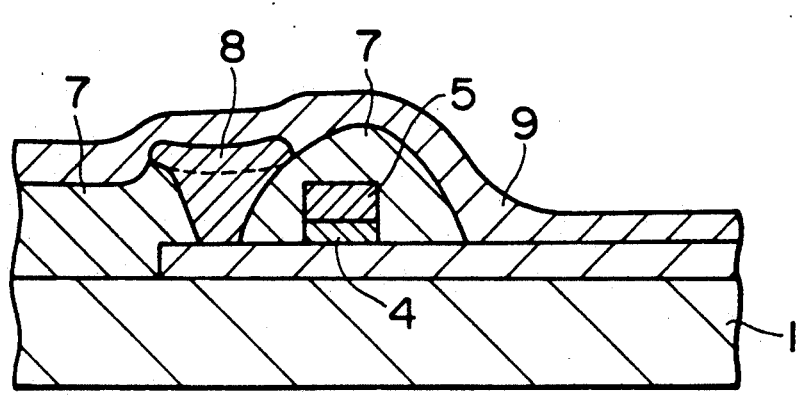
Figure 15:
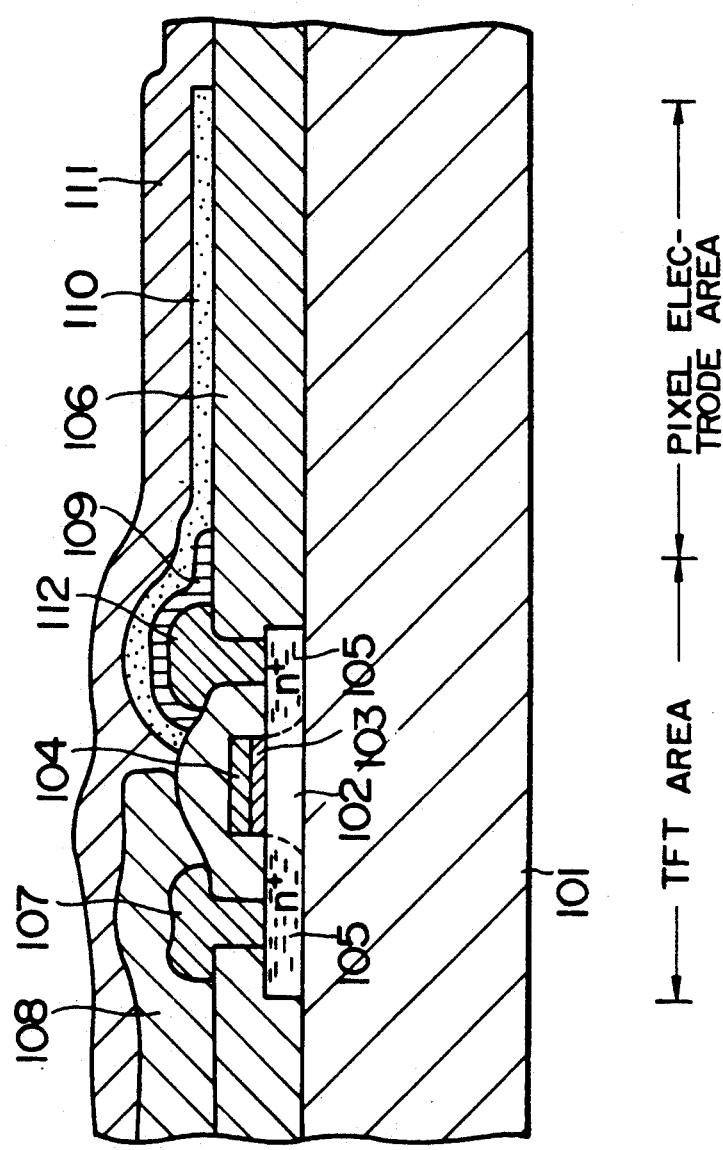
FIG. 15 is a view showing the structure of a pixel portion of the conventional image display device.

FIGS. 14a to 14e are cross sections for explaining a method of fabricating the image display device having such a structure as shown in FIG. 13. First, a polycrystalline silicon layer or film 2 having a thickness of 1500 Å is formed on a quartz substrate 1 by means of an LPCVD technique and the polycrystalline silicon film 2 is thereafter patterned so as to leave a region which serves as a TFT and a pixel electrode (see FIG. 14a). Next, a gate oxide film 4 having a thickness of 1300 Å is formed through thermal oxidation. At this time, the thickness of the polycrystalline silicon film is reduced to the order of 800 Å due to the thermal oxidation. Subsequently, a polycrystalline silicon film serving as a gate electrode 5 is deposited. Thereafter in a state in which oxide films other than the gate oxide film 4 below the gate electrode 5 have been removed, phosphorous ions ($P^+$) or arsenic ions ($As^+$) are implanted in a self-aligned manner to form n-type regions shown by dotted lines and to bring the pixel electrode portion into a conductive condition (see FIG. 14b). Further, an NSG film 7 having a thickness of 800 Å is formed for inter-layer isolation and an Al line film 8 for a source electrode is formed after a through-hole for contact to the Al line 8 is provided in the NSG film 7 (see FIG. 14c). Subsequently, a portion of the NSG film 7 on the pixel electrode is removed through wet etching (see FIG. 14d). Finally, as shown in FIG. 14e, a nitride film 9 for protection of electrodes having a thickness of 1500 Å is formed on the entire surface of the resultant structure by means of a plasma CVD technique, thereby providing a structure as shown in FIG. 13.

In the image display device thus fabricated, since only the nitride film 9 exists on the pixel electrode and the NSG film 7 does not exist on the pixel electrode, it is possible to effectively apply a voltage to the liquid crystal. Accordingly, an image display device is obtained which can be driven by a low voltage.

We claim:

1. An active matrix drive liquid crystal display device comprising:
   a substrate;
   a plurality of switching thin film transistors formed on the substrate in a matrix arrangement;
   a plurality of transparent polycrystalline silicon pixel electrodes corresponding to the respective switching thin film transistors, each of said pixel electrodes being formed in a one-piece body with a drain electrode of a corresponding one of said switching thin film transistors so that active layers of said switching thin film transistors and respective pixel electrodes are formed by common semiconductor layers; and
   a plurality of transparent electrodes disposed opposite to the pixel electrodes such that liquid crystal can be sandwiched between the pixel electrodes and the transparent electrodes.

2. An active matrix drive liquid crystal display device according to claim 1, wherein said pixel electrodes include light-transmissible holes.

3. An active matrix drive liquid crystal display device according to claim 1, wherein said pixel electrodes are sufficiently thin to allow transmission of light therethrough.

4. An active matrix drive liquid crystal display device according to claim 2, wherein said pixel electrodes are sufficiently thin to allow transmission of light therethrough.

5. An active matrix drive liquid crystal display device according to claim 2, wherein said active layers of the switching thin film transistors are sufficiently thin to allow transmittance of light therethrough.

6. An active matrix drive liquid crystal display device according to claim 5, further comprising wiring lines connected to electrodes of the switching thin film transistors and an inter-layer isolation film formed between said wiring lines, said inter-layer isolation film being absent on at least a part of said pixel electrodes.

7. An active matrix drive liquid crystal display device according to claim 3, wherein said active layers of the switching thin film transistors are sufficiently thin to allow transmittance of light therethrough.

8. An active matrix drive liquid crystal display device according to claim 7, further comprising wiring lines connected to electrodes of the switching thin film transistors and an inter-layer isolation film formed between said wiring lines, said inter-layer isolation film being absent on at least a part of said pixel electrodes.

9. An active matrix drive liquid crystal display device according to claim 1, wherein said active layers of the switching thin film transistors are sufficiently thin to allow transmittance of light therethrough.

10. An active matrix drive liquid crystal display device according to claim 9, further comprising wiring lines connected to electrodes of the switching thin film transistors and an inter-layer isolation film formed between said wiring lines, said inter-layer isolation film being absent on at least a part of said pixel electrodes.

11. An active matrix drive liquid crystal display device according to claim 2, further comprising wiring lines connected to electrodes of the switching thin film transistors and an inter-layer isolation film formed between said wiring lines, said inter-layer isolation film being absent on at least a part of said pixel electrodes.

12. An active matrix drive liquid crystal display device according to claim 2, further comprising an orientation film rubbed in a predetermined rubbing direction and a liquid crystal layer provided above the pixel electrodes and wherein said light-transmissible holes have a shape elongated in the rubbing direction of the orientation film .

13. An active matrix drive liquid crystal display device according to claim 12, wherein said active layers of the switching thin film transistors are sufficiently thin to allow transmittance of light therethrough.

14. An active matrix drive liquid crystal display device according to claim 13, further comprising wiring lines connected to electrodes of the switching thin film transistors and an inter-layer isolation film formed between said wiring lines, said inter-layer isolation film being absent on at least a part of said pixel electrodes.

* * * * *

UNITED STATES PATENT AND TRADEMARK OFFICE
CERTIFICATE OF CORRECTION

PATENT NO.  : 5,245,452
DATED       : September 14, 1993
INVENTOR(S) : NAKAMURA et al It is certified that error appears in the above-identified patent and that said Letters Patent is hereby corrected as shown below:

On the title page:   Item [54] and Column 1, line 1,    should read:

—ACTIVE MATRIX DRIVE LIQUID CRYSTAL DISPLAY DEVICE USING POLYCRYSTALLINE SILICON PIXEL ELECTRODES—.

Signed and Sealed this

Sixth Day of September, 1994

Attest:

BRUCE LEHMAN

Attesting Officer    Commissioner of Patents and Trademarks